United States Patent
Nagahama et al.

(10) Patent No.: US 8,669,324 B2
(45) Date of Patent: Mar. 11, 2014

(54) METHOD FOR PRODUCING BINDER FOR INKJET PRINTING INK, INKJET PRINTING INK, AND PRINTED MATERIAL

(75) Inventors: Sadamu Nagahama, Osaka (JP); Mitsuru Kitada, Osaka (JP); Chisato Kuriyama, Osaka (JP); Ryuichi Matsuoka, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/504,184

(22) PCT Filed: Mar. 28, 2011

(86) PCT No.: PCT/JP2011/057585
§ 371 (c)(1),
(2), (4) Date: Apr. 26, 2012

(87) PCT Pub. No.: WO2011/148709
PCT Pub. Date: Dec. 1, 2011

(65) Prior Publication Data
US 2012/0219769 A1    Aug. 30, 2012

(30) Foreign Application Priority Data
May 28, 2010   (JP) ................................. 2010-122701

(51) Int. Cl.
*C09D 11/00* (2006.01)
*C08G 18/28* (2006.01)
*C08G 18/08* (2006.01)

(52) U.S. Cl.
USPC ............................ 524/590; 524/589; 523/160

(58) Field of Classification Search
USPC ................................... 523/160; 524/589, 590
See application file for complete search history.

(56) References Cited

U.S. PATENT DOCUMENTS

| 4,882,616 | A  | * | 11/1989 | Manabe .......................... 348/273 |
| 5,656,701 | A  | * | 8/1997  | Miyamoto et al. ............ 525/453 |
| 6,605,666 | B1 | * | 8/2003  | Scholz et al. ................. 524/591 |
| 6,737,449 | B1 |   | 5/2004  | Yatake |
| 2004/0207703 | A1 | * | 10/2004 | Doi ................................. 347/100 |
| 2007/0213428 | A1 | * | 9/2007  | Hiraishi et al. ............... 523/160 |

FOREIGN PATENT DOCUMENTS

| CN | 101410469 A | 4/2009 |
| JP | 10-287837 A | 10/1998 |
| JP | 2003-213164 A | 7/2003 |
| JP | 2006-282760 A | 10/2006 |
| JP | 2007-231191 A | 9/2007 |

* cited by examiner

*Primary Examiner* — Alexander Kollias
(74) *Attorney, Agent, or Firm* — McDermott Will & Emery LLP

(57) ABSTRACT

An object of the present invention is to provide a method for producing a binder for inks and for use in producing an inkjet printing ink that has both good ink dischargeability and blend stability. A method for producing a binder for inkjet printing inks, the binder containing a hydrophilic-group-containing urethane resin (A), an acetylene compound (B), and an aqueous medium (C), includes step (1) of allowing Ga polyol (a1) containing a hydrophilic-group-containing polyol to react with a polyisocyanate (a2) in an organic solvent or in the absence of a solvent and feeding the organic solvent as needed to prepare an organic solvent solution [I], step (2) of mixing the organic solvent solution [I] with the acetylene compound (B) and the aqueous medium (C) to prepare a mixture [II], and step (3) of removing the organic solvent contained in the mixture [II].

15 Claims, No Drawings

US 8,669,324 B2

METHOD FOR PRODUCING BINDER FOR INKJET PRINTING INK, INKJET PRINTING INK, AND PRINTED MATERIAL

CROSS REFERENCE TO PRIOR APPLICATIONS

This application is a U.S. National Phase application under 35 U.S.C. §371 of International Application No. PCT/JP2011/057585, filed on Mar. 28, 2011 and claims benefit of priority to Japanese Patent Application No. 2010-122701, filed on May 28, 2010. The International Application was published in Japanese on Dec. 1, 2011 as WO 2011/148709 A1 under PCT Article 21(2). The contents of the applications are hereby incorporated by reference.

TECHNICAL FIELD

The present invention relates to a method for producing a binder used in an inkjet printing ink, for example.

BACKGROUND ART

The inkjet printing industry has shown a significant growth in recent years. Marked improvements in inks and the performance of inkjet printers have been made and it is beginning to be possible for people to easily produce high-gloss, high-resolution images comparable to silver halide photographs at home.

As for inks in particular, rapid improvements have been made to enhance the image quality and reduce environmental impact, such as transition from conventional dye inks to pigment inks and transition from solvent-based inks to aqueous inks. Presently, aqueous pigment inks are actively being developed.

With improvements in the performance of inkjet printers and the like, it is required that inks have various properties. Examples of such properties include ink discharge stability in which clogging of ink discharging nozzles of inkjet printers over time is prevented and ink discharge failures and discharging of ink in inadequate directions are prevented in the long term, and blend stability in which separation or aggregation of inks containing a binder resin, a pigment or a dye, and other additives over time does not occur.

An example of inkjet printing inks with high ink dischargeability and blend stability is an ink composition that contains at least a pigment, water, water-insoluble vinyl polymer particles that contain the pigment and enable the pigment to disperse in the ink composition, and a urethane resin. This ink composition can be mixed with an acetylene glycol serving as a surfactant and used (e.g., refer to PTL 1).

However this ink composition falls short of the levels of dischargeability and blend stabilities required by the industry and sometimes causes clogging of ink discharge nozzles over time when used over a long term.

CITATION LIST

Patent Literature

PTL 1: Japanese Unexamined Patent Application Publication No. 2006-282760

SUMMARY OF INVENTION

Technical Problem

An object of the present invention is to provide a binder for inkjet printing inks and for use in production of inkjet printing inks that have both high ink dischargeability and blend stability and a method for producing the binder.

Solution to Problem

The inventors of the subject invention have realized the importance of improving the affinity among the constituting components of inks in improving the ink discharge stability or blend stability, and have tried increasing the amounts of conventional surfactants and defoaming agents used in the inks.

However, inks containing excessive amounts of surfactants have exhibited poor discharge stability and blend stability and sometimes caused aggregation of ink constituting components and clogging of ink discharge nozzles over time.

Various types of surfactants have also been studied. For example, inks that contain silicone-based mineral oils generally known as defoaming agents have been studied but such inks also sometimes cause aggregation of ink constituting components and clogging of ink discharge nozzles over time.

The inventors have realized that not only the type of surfactants but also the timing at which the surfactants are used may be the key to improving the affinity among the ink constituting components and that the discharge stability and the blend stability of the resulting inkjet printing inks may be improved thereby.

As a result, the inventors have found that a binder for inkjet printing inks and for producing an inkjet printing ink having good discharge stability and blend stability can be obtained by using an acetylene compound as a surfactant if the acetylene compound is preliminarily mixed before part or all of the organic solvent is removed from an organic solvent solution of a hydrophilic-group-containing urethane resin that can form an ink binder to make the solution aqueous.

The present invention provides a method for producing a binder for inkjet printing inks, the binder containing a hydrophilic-group-containing urethane resin (A), an acetylene compound (B), and aqueous medium (C), the method including:

step (1) of allowing a polyol (a1) containing a hydrophilic-group-containing polyol (a1-1) to react with a polyisocyanate (a2) in an organic solvent (D) or in the absence of a solvent and feeding the organic solvent (D) as needed to prepare an organic solvent (D) solution [I] of a hydrophilic-group-containing urethane resin (A);

step (2) of mixing the organic solvent (D) solution [I] with the acetylene compound (B) and the aqueous medium (C) to prepare a mixture [II]; and step (3) of removing part or all of the organic solvent (D) contained in the mixture [II].

The present invention also provides an inkjet printing ink containing the binder for inkjet printing inks and a pigment or dye, and a printed material formed by using the ink.

Advantageous Effects of Invention

According to the production method of the present invention, a binder for inkjet printing inks and for use in inkjet printing inks having good ink dischargeability and blend stability can be obtained.

Since the binder for inkjet printing inks obtained by the production method of the present invention have a high quick-drying property, high-definition printed images with high rubfastness can be formed without decreasing the production efficiency even when printers, such as industrial wide format printers, that discharge large amounts of inks are used.

DESCRIPTION OF EMBODIMENTS

The present invention provides a method for producing a binder for inkjet printing inks, the binder containing a hydrophilic-group-containing urethane resin (A), an acetylene compound (B), an aqueous medium (C), and, if needed, other additives.

The production method of the present invention includes the following steps (1) to (3). Each of the steps will now be described in detail.

The step (1) is a step of allowing a polyol (a1) containing a hydrophilic-group-containing polyol (a1-1) to react with a polyisocyanate (a2) in an organic solvent (D) or in the absence of a solvent and feeding the organic solvent (D) as needed to prepare an organic solvent (D) solution [I] of a hydrophilic-group-containing urethane resin (A).

An example of a specific method for preparing the organic solvent (D) solution [I] of a hydrophilic-group-containing urethane resin (A) is a method with which the polyol (a1) and the polyisocyanate (a2) are fed into the organic solvent (D) preliminarily adjusted to 30 to 150° C. either in one step or sequentially and the reaction is carried out at 70 to 150° C. for 3 to 30 hours. This reaction is preferably conducted in the presence of 5% by mass to 300% by mass of the organic solvent (D) relative to the total amount of the polyol (a1) and the polyisocyanate (a2). After the reaction is terminated, the organic solvent (D) may be further added if needed.

Alternatively, the organic solvent (D) solution [I] of a hydrophilic-group-containing urethane resin (A) can be prepared by mixing the polyol (a1) and the polyisocyanate (a2) in the absence of a solvent, carrying out the reaction at 60° C. to 200° C. for about 0.5 to 10 hours, and adding the organic solvent (D) during the course of or after termination of the reaction.

The polyol (a1) used in preparing the organic solvent (D) solution [I] of a hydrophilic-group-containing urethane resin (A) must be a hydrophilic-group-containing polyol (a1-1) and another polyol (a1-2) having no hydrophilic groups may be used in combination as needed. When the hydrophilic-group-containing polyol (a1-1) and the polyol (a1-2) are used in combination as the polyol (a1), the polyols may be preliminarily mixed with each other or may be separately fed into a reactor.

When the hydrophilic-group-containing polyol (a1-1) and the polyol (a1-2) are used in combination, the hydrophilic-group-containing polyol (a1-1) is preferably reacted with the polyisocyanate (a2) in the organic solvent (D) to prepare an organic solvent (D) solution of a hydrophilic-group-containing urethane prepolymer (A-1) and then the organic solvent (D) solution of the hydrophilic-group-containing urethane prepolymer (A-1) is preferably mixed with the polyol (a1-2) to carry out reaction and to thereby prepare an organic solvent (D) solution [I] of a hydrophilic-group-containing urethane resin (A). This is preferred in producing an inkjet printing ink that achieves both excellent, ink blend stability and discharge stability.

Alternatively, an organic solvent (D) solution [I] of a hydrophilic-group-containing urethane resin (A) may be prepared by allowing the hydrophilic-group-containing polyol (a-1) to react with the polyisocyanate (a2) in the absence of a solvent to prepare a hydrophilic-group-containing urethane prepolymer (A-1) and then mixing the urethane prepolymer (A-1) with a mixture containing the polyol (a1-2) and the organic solvent (D) to carry out reaction.

The hydrophilic-group-containing polyol (a1-1) may be added in two or more divided portions to the polyisocyanate (a2) and reacted. In particular, in order to produce the inkjet printing ink having good discharge stability and blend stability, it is preferable to prepare an organic solvent (D) solution [I] of a hydrophilic-group-containing urethane resin (A) by allowing part of the hydrophilic-group-containing polyol (a1-1) to react with the polyisocyanate (a2) in the organic solvent (D) to prepare an organic solvent (D) solution of a hydrophilic-group-containing urethane prepolymer (A-1) and then feeding all at the same time or separately the organic solvent (D) solution of the urethane prepolymer (A-1), the rest of the hydrophilic-group-containing polyol (a1-1), and, if needed, the polyol (a1-2) to induce the reaction. In this case, it is preferable to use 40% by mass to 80% by mass of the total of the hydrophilic-group-containing polyol (a1-1) used in the production of the hydrophilic-group-containing urethane resin (A) during the preparation of the organic solvent (D) solution of the urethane prepolymer (A-1) and to use the rest, i.e., 20% by mass to 60% by mass, in the reaction with the urethane prepolymer (A-1) in order to produce an inkjet printing ink having good discharge stability and blend stability.

The reaction of the polyol (a1) and the polyisocyanate (a2) is preferably conducted so that the equivalent ratio of the isocyanate groups of the polyisocyanate (a2) to the hydroxyl groups of the polyol (a1), i.e., [isocyanate groups/hydroxyl groups], is within a range of 0.8 to 2.5 and more preferably in a range of 0.9 to 1.5. When the chain extender described below is used, this equivalent ratio is preferably within a range of 1.1 to 1.5.

Examples of the hydrophilic-group-containing polyol (a1-1) include an anionic-group-containing polyol, a cationic-group-containing polyol, and a nonionic-group-containing polyol. Preferably, an anionic-group-containing polyol or a cationic-group-containing polyol is used and more preferably an anionic-group-containing polyol is used to impart good discharge stability and blend stability to the ink.

Examples of the anionic-group-containing polyol include a polyol containing a carboxyl group, a sulfonic acid group, a carboxylate group, or a sulfonate group. For example, a carboxyl-group-containing polyol such as 2,2'-dimethylol propionic acid, 2,2'-dimethylol butanoic acid, 2,2'-dimethylol butyric acid, or 2,2'-dimethylol valeric acid, or a sulfonic-acid-group-containing polyol such as 5-sulfoisophthalic acid, sulfoterephthalic acid, 4-sulfophthalic acid, or 5[4-sulfophenoxy]isophthalic acid may be used.

A hydrophilic-group-containing polyester polyol obtained by reaction of a low-molecular-weight hydrophilic-group-containing polyol, such as the carboxyl-group-containing polyol or the sulfonic-acid-group-containing polyol described above, and a polycarboxylic acid such as adipic acid may be used as the anionic-group-containing polyol.

The anionic-group-containing polyol may be a polyol having some or all of the anionic groups preliminarily neutralized with a basic compound into carboxylate groups or sulfonate groups, for example.

Examples of the basic compound include organic amines such as ammonia, triethylamine, pyridine, and morpholine, alkanolamines such as monoethanol amine, and metal basic compounds containing Na, K, Li, Ca, etc.

A polyol having a tertiary amino group, a functional group prepared by neutralizing a tertiary amino group with an acidic compound, or a quaternary compound prepared by quaternarizing a tertiary amino group with a quaternarizing agent can be used as the cationic-group-containing polyol.

Examples of the acidic compound include acetic acid, propionic acid, lactic acid, maleic acid, sulfonic acid, methanesulfonic acid, hydrochloric acid, sulfuric acid, orthophosphoric acid, and orthophosphorous acid. Examples of the quaternarizing agent include dimethyl sulfuric acid, diethyl sulfuric acid, methyl chloride, ethyl chloride, benzyl chloride, methyl methanesulfonate, and methyl paratoluenesulfonate.

Examples of the nonionic-group-containing polyol include those that contain polyoxyalkylene groups such as a polyoxyethylene group, a polyoxypropylene group, a polyoxybutylene group, a poly(oxyethylene-oxypropylene) group, and a polyoxyethylene-polyoxypropylene group.

In particular, a polyol having a polyalkylene oxide chain with a molecular weight of preferably about 400 to 3000 and more preferably 600 to 1000 is used. A polyol having a polyethylene oxide chain as the polyalkylene oxide chain is preferably used.

A product commercially available under the trade name of "Ymer N120" from Perstorp can be used as the polyol having a polyalkylene oxide chain, for example.

The hydrophilic-group-containing polyol (a1-1) is preferably used in an amount of 5% by mass to 20% by mass relative to the total amount of the polyol (a1) and the polyisocyanate (a2) to achieve both good storage stability and blend stability of the ink. The preferred amount is also 5% by mass to 20% by mass even when the anionic-group-containing polyol is used as the hydrophilic-group-containing polyol (a1-1).

A polyol having no hydrophilic group can be used as the polyol (a1-2). For example, an alicyclic-structure-containing polyol can be used.

Examples of the alicyclic-structure-containing polyol include alicyclic-structure-containing polyols having a low molecular weight, of about 100 to 500, such as cyclobutanediol, cyclopentanediol, 1,4-cyclohexanediol, cycloheptanediol, cyclooctanediol, cyclohexanedimethanol, hydroxypropylcyclohexanol, dicyclohexanediol, butylcyclohexanediol, 1,1'-bicyclohexylidenediol, cyclohexanetriol, hydrogenated bisphenol A, and 1,3-adamantanediol, alicyclic-structure-containing polycarbonate polyols, alicyclic-structure-containing polyester polyols, and alicyclic-structure-containing polyether polyols. These may be used alone or in combination.

The alicyclic-structure-containing polyol is preferably used in an amount of 0.5% by mass to 25% by mass relative to the total amount of the polyol (a1) and the polyisocyanate (a2) used in preparing the hydrophilic-group-containing urethane resin (A) in order to improve the rubfastness and chemical resistance of printed images.

Examples of the polyol (a1-2) other than the alicyclic-structure-containing polyols include polyether polyols, polycarbonate polyols, and polyester polyols. The polyether polyols, polycarbonate polyols, and polyester polyols are not to contain a hydrophilic group or an alicyclic structure so that they can be distinguished from the hydrophilic-group-containing polyol (a2-1) and the alicyclic-structure-containing polyols described above. Hydrophilic-group-containing polyether polyols, polycarbonate polyols, and polyester polyols are included in the hydrophilic-group-containing polyol (a2) and alicyclic-structure-containing polyether polyols, polycarbonate polyols, and polyester polyols are included in the alicyclic-structure-containing polyols.

The polyether polyol or the polycarbonate polyol is preferably used as the polyol (a1-2) in combination with the hydrophilic-group-containing polyol (a1-1) so that both good discharge stability and blend stability of the ink can be achieved and an inkjet printing ink capable of forming printed images with high rubfastness can be obtained. More preferably, the polyether polyol is used in combination with an anionic-group-containing polyol.

The polyether polyol may be a polyether polyol prepared by addition polymerization of an alkylene oxide using at least one compound having two or more active hydrogen atoms as the initiator, for example.

Examples of the initiator include ethylene glycol, diethylene glycol, triethylene glycol, propylene glycol, trimethylene glycol, 1,3-butanediol, 1,4-butanediol, 1,6-hexanediol, glycerin, trimethylolethane, and trimethylolpropane.

Examples of the alkylene oxide include ethylene oxide, propylene oxide, butylene oxide, styrene oxide, epichlorohydrin, and tetrahydrofuran.

Polytetramethylene glycol or polypropylene glycol is particularly preferably used as the polyether polyol from the viewpoint, of obtaining a binder for inkjet printing ink and an ink having good discharge stability and blend stability and being capable of forming printed images having high rubfastness.

A polyether polyol having a number-average molecular weight of 500 to 7000 may be used as the polyether polyol. When polytetramethylene glycol or polypropylene glycol is used as the polyether polyol, the number-average molecular weight is preferably 500 to 5000 and more preferably 500 to 3500 in order to achieve both higher discharge stability and blend stability and form printed images with high rubfastness.

The polycarbonate polyol that can be used as another polyol may be a polycarbonate polyol produced by allowing a polyol to react with a carbonate or phosgene to react with bisphenol A or the like.

Examples of the carbonate include methyl carbonate, dimethyl carbonate, ethyl carbonate, diethyl carbonate, cyclocarbonate, and diphenyl carbonate.

Examples of the polyol that can be reacted with the carbonate include dihydroxy compounds having a relatively low molecular weight such as ethylene glycol, diethylene glycol, 1,2-propylene glycol, dipropylene glycol, 1,4-butanediol, 1,5-pentanediol, 3-methyl-1,5-pentanediol, and 1,4-cyclohexanediol, polyethylene glycol, polypropylene glycol, and polyester polyol such as polyhexamethylene adipate.

Examples of the polyester polyol include those obtained by esterification of a low-molecular-weight polyol and a polycarboxylic acid, a polyester obtained by ring-open polymerization of a cyclic ester compound such as ε-caprolactone, and a copolymer polyester of these.

Examples of the low-molecular-weight polyol include ethylene glycol and propylene glycol.

Examples of the polycarboxylic acid include succinic acid, adipic acid, sebacic acid, dodecane dicarboxylic acid, terephthalic acid, isophthalic acid, phthalic acid, and anhydrides thereof and ester-forming derivatives thereof.

The polyether polyol, polycarbonate polyol, and the polyester polyol are preferably used in an amount of 25% by mass to 95% by mass relative to the total amount of the polyol (a1) and the polyisocyanate (a2) used in preparing the hydrophilic-group-containing urethane resin (A). In particular, when a polyether polyol and preferably polytetramethylene glycol or polypropylene glycol is to be used, the amount is preferably 30% by mass to 90% by mass and more preferably 45% by mass to 85% by mass relative to the total amount of the polyol (a1) and the polyisocyanate (a2) used for preparing the hydrophilic-group-containing urethane resin in order to achieve both higher discharge stability and blend stability and form printed images having high rubfastness.

Examples of the polyisocyanate (a1) used in the step (1) include aromatic diisocyanates such as phenylene diisocyanate, tolylene diisocyanate, diphenylmethane diisocyanate, and naphthalene diisocyanate; and aliphatic or alicyclic-structure-containing diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. These may be used alone or in combination. Among these, an alicyclic-structure-containing diisocyanate is preferably used to obtain an ink having good discharge stability and good blend stability.

Solvents having a boiling point lower than the aqueous medium, such as ketone such as acetone and methyl ethyl ketone, ethyl acetate, and tetrahydrofuran may be used alone or in combination as the organic solvent (D) used in the step (1) of preparing the hydrophilic-group-containing urethane resin (A). Among these, a ketone such as acetone or methyl ethyl ketone is preferably used to prevent aggregation in the step of producing a binder for inkjet printing ink and to carry out stable production.

Organic solvents having higher hydrophilicity may be used in combination with the solvent having a lower boiling point than the aqueous medium as long as the effects of the present invention are not impaired. Examples of the organic solvent include monoalcohols such as methanol, ethanol, and isopropanol, polyol compounds such as ethylene glycol, diethylene glycol, and glycerin, and amides such as dimethylformamide and N-methyl-2-pyrrolidone. The organic solvent having high hydrophilicity is preferably used before and/or after the step (3).

The hydrophilic-group-containing urethane resin (A) preferably contains a urea bond from the viewpoint of obtaining an inkjet printing ink that can form printed images with high rubfastness. The rubfastness is a property that can prevent deterioration or the like of printed images caused by separation of pigments and the like that can occur in printed image surfaces under external force such as rubbing.

The hydrophilic-group-containing urethane resin having a urea bond may be prepared by, for example, allowing the polyol (a1) to react with the polyisocyanate (a2) in the organic solvent (D) or in the absence of a solvent and adding the organic solvent (D) if needed to prepare an organic solvent (D) solution of a hydrophilic-group-containing urethane prepolymer (A-1) terminated with isocyanate groups, and mixing the organic solvent (D) solution with an amino-group-containing compound to allow the isocyanate groups of the urethane prepolymer (A-1) to react with the amino-group-containing compound.

Examples of the amino-group-containing compound include monoamines having one or more active hydrogen atoms such as ethylamine, n-propylamine, isopropylamine, n-butylamine, diethylamine, di-n-propylamine, diisopropylamine, di-n-butylamine, cyclohexylamine, aniline, monoethanolamine, monoisopropanolamine, diethanolamine, and diisopropanolamine.

The hydrophilic-group-containing urethane resin (A) preferably has a weight-average molecular weight of 3000 to 200000, more preferably 10000 to 80000, and most preferably 20000 to 65000 since the inkjet printing ink can achieve both excellent discharge stability and excellent blend stability. Moreover, when high rubfastness is to be imparted to the inkjet printing ink obtained in the present invention, a high-molecular-weight polymer having a weight-average molecular weight more than 50000 but not more than 200000 may be used as the hydrophilic-group-containing urethane resin (A).

In preparing the hydrophilic-group-containing urethane resin having a high molecular weight, a chain extender can be used if needed. A specific example thereof is a method with which the polyol (a1) and the polyisocyanate (a1) are fed all at the same time or sequentially into the organic solvent (D) adjusted to 10° C. to 60° C., the reaction is carried out at 10° C. to 60° C. for about 0.1 to 5.0 hours to prepare a organic solvent (D) solution of a hydrophilic-group-containing urethane prepolymer (A-1), and this organic solvent (D) solution and a chain extender are mixed to carry out reaction.

Examples of the chain extender that can be used in preparing the urethane resin (A) include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine; diamines containing one primary amino group and one secondary amino group such as N-hydroxymethylaminoethylamine, N-hydroxyethylaminoethylamine, N-hydroxypropylaminopropylamine, N-ethylaminoethylamine, and N-methylaminopropylamine; polyamines such as diethylenetriamine, dipropylenetriamine, and triethylenetetramine; hydrazines such as hydrazine, N,N'-dimethylhydrazine, and 1,6-hexamethylenebishydrazine; dihydrazides such as dihydrazide succinate, dihydrazide adipate, dihydrazide glutarate, dihydrazide sebacate, and dihydrazide isophthalate; polyamines of semicarbazides and the like such as β-semicarbazide propionic acid hydrazide, 3-semicarbazide-propylcarbazinic ester, and semicarbazide-3-semicarbazidemethyl-3,5,5-trimethylcyclohexane; glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin and sorbitol; phenols such as bisphenol A, 4,4'-dihydroxydiphenyl, 4,4'-dihydroxydiphenyl ether, 4,4'-dihydroxydiphenylsulfone, hydrogenated bisphenol A, and hydroquinone; and water.

When the chain extender is to be used, for example, the equivalent ratio of the amino groups of the polyamine to the isocyanate groups of the urethane prepolymer, i.e., [amino groups/isocyanate groups], is preferably 1.9 or less (equivalent ratio) and more preferably in a range of 0.3 to 1.0 (equivalent ratio).

The organic solvent (D) solution [I] of a hydrophilic-group-containing urethane resin obtained in the step (1) preferably contains 15% by mass to 85% by mass of the hydrophilic-group-containing urethane resin (A) relative to the total amount of the solution [I].

The step (2) of the method for producing a binder for inkjet printing ink of the present invention will now be described.

The step (2) is a step in which the organic solvent (D) solution [I] of a hydrophilic-group-containing urethane resin (A) obtained in the step (1) is mixed with an acetylene compound (B), an aqueous medium (C), and, if needed, other additives to prepare a mixture [II].

In the production method of the present invention, it is important that the step (2) of preparing the mixture [II] by mixing the organic solvent (D) solution [I] with the acetylene compound (B) and the aqueous medium (C) be preliminarily conducted before starting the step (3) described below. In this manner, a binder for inkjet printing ink can be obtained which can be used in producing an inkjet printing ink having blend stability and long-term ink discharge stability that prevents clogging of the ink discharge nozzles of the inkjet printer over time and prevents discharging of ink in inappropriate directions.

If an inkjet printing ink is obtained by not using the acetylene compound (B) in the step (2) but mixing all the acetylene compound (B) with the binder of an inkjet printing ink, a pigment, etc., to produce an ink as in the related art, such an ink is more likely to undergo separation in a long-term storage and cause clogging of ink discharging nozzles and discharging of the ink in inappropriate directions when printing is conducted for a long time compared to an inkjet printing ink produced by using the binder for inkjet printing ink obtained in the production method of the present invention.

Accordingly, it is essential that the acetylene compound (B) be used in the step (2) in the present invention. However, the present invention does not exclude use of the acetylene compound in producing an ink by mixing and blending a binder for an inkjet printing ink, a pigment, etc., as in the related art.

An example of the method for mixing the organic solvent (D) solution [I] of a hydrophilic-group-containing urethane resin (A) with the acetylene compound (B) and the aqueous medium (C) is a method with which these raw materials are added all at once or sequentially under a condition of 20° C. to 80° C.

In particular, a method for making the mixture [II], the method including mixing and stirring the solution [I] and the aqueous medium (C) at 20° C. to 80° C. to prepare a mixture [II'] of the hydrophilic-group-containing urethane resin (A), the organic solvent (D), and the aqueous medium (C), and then mixing the mixture [II'] with the acetylene compound (B) is preferable since the affinity among the hydrophilic-group-containing urethane resin (A), the acetylene compound (B), the aqueous medium (C), and other components is enhanced and the stability and production efficiency of the binder for inkjet printing inks can be improved. Feeding of the acetylene compound (B) to the mixture [II'] may be conducted all at once or sequentially.

When the aforementioned mixing method is employed, some or all of the hydrophilic groups of the hydrophilic-group-containing urethane resin (A) in the solution [I] are preferably preliminarily neutralized with a basic compound or the like before starting the step (2) in order to maintain good dispersion stability of the hydrophilic-group-containing urethane resin in the aqueous medium (C). Note that neutralization of the hydrophilic groups is not essential. When part or all of the hydrophilic-group-containing polyol (a2-1) used in preparing the hydrophilic-group-containing urethane resin (A) is preliminarily neutralized to give, for example, carboxylate groups or sulfonate groups, there is no need to repeat the neutralization step before the step (2).

The acetylene compound (B) used in the step (2) and, if needed, in the step (3) is preferably used in an amount of 0.001 parts by mass to 0.5 parts by mass relative to 100 parts by mass of the hydrophilic-group-containing urethane resin (A). The amount is more preferably 0.005 parts by mass to 0.1 parts by mass in order to maintain good discharge stability and storage stability of the ink.

In the present invention, all, of the acetylene compound (B) may be used in the step (2) but this is not essential. In particular, preferably 60% by mass to 100% by mass and more preferably 60% by mass to 90% by mass of the acetylene compound (B) is mixed with the organic solvent (D) solution [I], the aqueous medium (C), and other components and the rest, i.e., preferably 40% by mass to 0% by mass and more preferably 40 to 10% by mass, of the acetylene compound is used in the step (3) described below in order to suppress generation of bubbles in the production process and improve the efficiency for producing the binder for inkjet printing inks.

Acetylene monoalcohols and acetylene glycols may be used alone or in combination as the acetylene compound (B).

An acetylene monoalcohol is a compound having en acetylene group and one hydroxyl group. For example, compounds represented by general formula (3) below can be used.

An acetylene glycol is a compound having an acetylene group and two hydroxyl groups. For example, compounds represented by general formula (1) or (2) can be used.

Among these, an acetylene glycol is preferably used since good blend stability of the ink and good discharge stability of the ink can be maintained for a long time.

[Chem. 1]

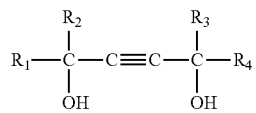

General formula (1)

($R_1$ and $R_4$ in general formula (1) each independently represent a hydrogen atom or an alkyl group. $R_2$ and $R_3$ each independently represent a methyl group or an ethyl group.)

[Chem. 2]

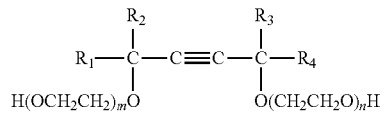

General formula (2)

($R_1$ and $R_4$ in general formula (2) each independently represent a hydrogen atom or an alkyl group. $R_2$ and $R_3$ each independently represent a methyl group or an ethyl group and m and n each represent an integer of 1 to 60.)

[Chem. 3]

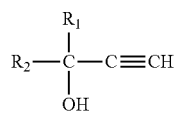

General formula (3)

($R_1$ and $R_2$ in general formula (3) each independently represent a hydrogen atom or an alkyl group.)

Examples of the acetylene compound (B) include 2,4,7,9-tetramethyl-5-decyne-4,7-diol, 2,4,7,9-tetramethyl-5-decyne-4,7-diol, 2,5,8,11-tetramethyl-6-dodecyne-5,8-diol, 2,4,4,7,9-pentamethyl-5-decyne-7-ol, and alkylene oxide adducts thereof.

Examples of the alkylene oxide include ethylene oxide and a copolymer of ethylene oxide and propylene oxide. The alkylene oxide is preferably ethylene oxide.

Examples of the acetylene compound (B) include commercially available Surfynol 104 series containing acetylene glycol represented by general formula (1), commercially available Surfynol 400 series containing acetylene glycol represented by general formula (2), and commercially available Surfynol 500 series containing acetylene monoalcohol represented by general formula (3) (all products from Air Products and Chemicals, Inc.). Among these, Surfynol 104 series, Surfynol 400 series, and solutions thereof diluted with solvents or the like are preferable.

Examples of the aqueous medium (C) include water and a mixture of water and an organic solvent miscible with water. Examples of the organic solvent miscible with water include alcohols such as methanol, ethanol, and n- and isopropanol, polyalkylene glycols such as ethylene glycol, diethylene glycol, and propylene glycol, alkyl ethers such as polyalkylene glycol, and lactams such as N-methyl-2-pyrrolidone. In the present invention, water is preferably used alone from the viewpoint of reducing the impact on the environment.

The aqueous medium (C) is preferably used in an amount of 100 to 700% by mass and more preferably 300 to 500% by mass relative to the total amount of the hydrophilic-group-containing urethane resin (A) in the step (2).

Next, the step (3) of the method for producing the binder for inkjet printing inks of the present invention is described.

The step (3) is a step of removing part or all of the organic solvent (D) contained in the mixture [II] obtained through the steps (1) and (2).

An inkjet printing ink obtained by using a binder for inkjet printing inks, the binder containing a large amount of remaining organic solvent (D), is not favored due to the VOC regulation or in providing eco-friendly products. Accordingly, in the step (3), 95% by mass or more, preferably 99% by mass or more, and most preferably all of the organic solvent (D) contained in the mixture [II] is removed so as to prepare a binder for inkjet printing inks composed of a composition in which the hydrophilic-group-containing urethane resin (A) is stably dispersed or dissolved in the aqueous medium (C).

Examples of the method for removing the organic solvent (D) include a distillation method and a reflux method. Among these, a distillation method is preferably employed. A vacuum distillation method of conducting distillation under vacuum is preferably employed to efficiently remove the organic solvent (D) in the binder for inkjet printing inks.

The vacuum distillation method includes, for example, vacuuming the interior of a reactor containing the mixture [II] in a range of 1 KPa to 50 KPa relative to the atmospheric pressure (100 kPa) in 0.5 to 5.0 hours and then carrying out distillation for about 3 to 30 hours under the same vacuum condition. The amount of the organic solvent (D) in the mixture [II] can be monitored with a flow meter during the vacuum distillation.

In removing the organic solvent (D) by the distillation method, the organic solvent (D) is usually preferentially removed by distillation since the boiling point of the organic solvent (D) is lower than the boiling point of the aqueous medium (C). However, part of the aqueous medium (C) is also removed.

In the present invention, the distillation is preferably continued until the aqueous medium (C) having a mass equal to 50% by mass to 300% by mass and more preferably 50% by mass to 150% by mass of the total mass of the organic solvent (D) contained in the mixture [II] is removed from the mixture [II].

In particular, when 10 parts by mass of the organic solvent (D) is contained in the mixture [II], the distillation is preferably continued until 5 parts by mass to 30 parts by mass, i.e., 50% by mass to 300% by mass of the 10 parts by mass, of aqueous medium (C) is removed from the mixture [II].

As a result, 99% by mass or more and particularly preferably substantially all of the organic solvent (D) contained in the mixture [II] can be removed.

In the step (3), the acetylene compound (B) may be used as in the step (2). That is, in the step (2) before the step (3), instead of using all the acetylene compound (B), preferably 60% by mass to 90% by mass and more preferably 60% by mass to 85% by mass of the total amount of the acetylene compound (B) may be used and the rest, i.e., 40% by mass to 10% by mass, of the acetylene compound (B) may be used in the step (3).

The rest, i.e., 40% by mass to 10% by mass, of the acetylene compound (B) may be used at any timing during the course of the step (3). However, the acetylene compound (B) is preferably continuously fed during the time from when 80% by mass of the organic solvent (D) in the mixture [II] is removed from the mixture [II] to when the aqueous medium (C) in a mass equal to 10% by mass of the total amount of the organic solvent (D) contained in the mixture [II] is removed.

To be specific, if the mixture [II] contains 10 parts by mass of the organic solvent (D), the acetylene compound (B) is preferably fed after 8 parts by mass equal to 80% by mass of the 10 parts by mass has been removed from the mixture [II]. The feeding is preferably continued until the aqueous medium (C) in an amount of 1 part by mass equal to 10% by mass of the total amount of the organic solvent (D) is removed from the mixture [II]. As a result, foaming that can occur during preparation of the binder for inkjet printing inks can be suppressed and the production efficiency can be improved. The acetylene compound (B) may be fed to the mixture [II] all at once or sequentially.

Even in the case where the acetylene compound (B) is fed during this step (3), the amount of the acetylene compound (B) contained in the binder for the final product, i.e., an inkjet printing ink, is preferably 0.001 parts by mass to 0.5 parts by mass and more preferably 0.005 parts by mass to 0.1 parts by mass relative to 100 parts by mass of the hydrophilic-group-containing urethane resin (A) as described above.

The binder for inkjet printing inks obtained through the steps (1) to (3) described above preferably contains the hydrophilic-group-containing urethane resin (A) having an average particle diameter of preferably about 10 nm to 350 nm stably dispersed or dissolved in the aqueous medium (C) from the viewpoint of maintaining excellent ink discharge stability and blend stability.

The binder for inkjet printing inks preferably contains 5% by mass to 40% by mass and more preferably 10% by mass to 30% by mass of the hydrophilic-group-containing urethane resin (A) relative to the total amount of the binder for inkjet printing inks. The binder for inkjet printing inks preferably contains 60% by mass to 95% by mass and more preferably 70% by mass to 90% by mass of the aqueous medium (C) relative to the total amount of the binder for inkjet printing inks.

The inkjet printing ink according to the present invention will now be described.

The binder for inkjet printing inks obtained by the production method of the present invention can be used in producing an inkjet printing ink having good ink discharge stability and blend stability.

The inkjet printing ink according to the present invention contains a pigment or dye, and various types of additives as needed in addition to the binder for the inkjet printing inks.

A known inorganic or organic pigment can be used as the pigment.

Examples of the inorganic pigment include titanium oxide, antimony red, colcothar, cadmium red, cadmium yellow, cobalt blue, Prussian blue, ultramarine blue, carbon black, and graphite.

Examples of the organic pigment include quinacridone pigments, quinacridone-quinone pigments, dioxazine pigments, phthalocyanine pigments, anthrapyrimidine pigments, anthanthrone pigments, indanthrone pigments, flavanthrone pigments, perylene pigments, diketopyrropyrrole pigments, perinone pigments, quinophthalone pigments, anthraquinone pigments, thioindigo pigments, benzimidazolone pigments, and azo pigments.

Two or more of these pigments may be used in combination. These pigments may be surface-treated to impart a self-dispersing capacity in an aqueous medium.

Examples of the dyes include azo dyes such as monoazo and disazo, metal complex salt dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, naphthalimide dyes, perinone dyes, phthalocyanine dyes, and triarylmethane dyes.

Examples of the additives include a polymer dispersing agent, a viscosity adjuster, a humectant, a defoaming agent, a surfactant, a preservative, a pH adjuster, a chelating agent, a plasticizer, a UV absorber, an antioxidant, and acrylic resins conventionally used in binders for inkjet printing inks.

Examples of the polymer dispersing agent include acrylic resins and styrene-acrylic resins which may be of a random type, a block type, or a graft type. When the polymer dispersing agent is used, an acid or a base may be used in combination to neutralize the polymer dispersing agent.

In producing an inkjet printing ink of the present invention, a surfactant such as an acetylene compound may be used as the additive during the stage of formulating ink by mixing an ink binder, a pigment or a dye, and other components as in the related art. However, the acetylene compound must be used in the step (2) from the viewpoint of maintaining good ink discharge stability and blend stability.

The inkjet printing ink can be prepared by the following production method, for example.

(X) A method for preparing an ink, the method including mixing the pigment or dye, the aqueous medium, the binder for inkjet ink, and if needed, the additive all at once by using any of various types of dispersers.

(Y) A method for preparing an ink, the method including mixing the pigment or dye, the aqueous medium, and, if needed, the additive by using any of various types of dispersers to prepare an ink precursor which is an aqueous dispersion of the pigment or dye and then mixing the ink precursor which is the aqueous dispersion of the pigment or dye, the binder for inkjet printing inks, and, if needed, an aqueous medium and additives by using any of various types of dispersers.

The ink precursor containing a pigment usable in the ink production method described in the paragraph (Y) above can be prepared by the following method, for example.

(y1) A method for preparing an ink precursor which is an aqueous dispersion containing the pigment, the method including mixing a kneaded material obtained by preliminarily kneading a pigment and additives such as a polymer dispersing agent by using twin rollers, a mixer, or the like, with an aqueous medium by using any of various types of dispersers.

(y2) A method for preparing an ink precursor which is an aqueous dispersion containing the pigment, the method including mixing a pigment and a polymer dispersing agent by using any of various types of dispersers, allowing the polymer dispersing agent to deposit on surfaces of the pigment by controlling the solubility of the polymer dispersing agent, and conducting mixing with a disperser.

(y3) A method for preparing an ink precursor which is an aqueous dispersion containing the pigment, the method including mixing a pigment and the additives by using any of various types of dispersers and then mixing the resulting mixture with a resin emulsion by using a disperser.

Examples of the disperser the can be used in production of the inkjet printing ink include an ultrasonic homogenizer, a high-pressure homogenizer, a paint shaker, a ball mill, a roll mill, a sand mill, a sand grinder, a Dyno mill, a dispermat, a SC mill, and a nanomizer. These may be used alone or in combination.

Coarse particles having a diameter of about 250 nm or more may be present in the inkjet printing ink obtained in the aforementioned method. The coarse particles may cause clogging of printer nozzles and deterioration of the ink discharge properties. Thus, the coarse particles are preferably removed by centrifugal separation, filtration, or the like after preparation of the aqueous dispersion of the pigment or after preparation of the ink.

The inkjet printing ink obtained in the above preferably has a volume-average particle diameter of 200 nm or less. In particular, in forming higher-gloss images such as images having photographic qualities, the volume-average particle diameter is more preferably in a range of 80 nm to 120 nm.

The inkjet printing ink preferably contains 0.1% by mass to 10% by mass of the hydrophilic-group-containing urethane resin (A) relative to the total of the inkjet printing ink in order to achieve both quick-drying property and durability of printed images formed by the ink. The ink preferably further contains 50% by mass to 95% by mass of the aqueous medium (C) and 0.5% by mass to 15% by mass of the pigment.

The inkjet printing ink of the present invention obtained by the aforementioned method can be mainly used in inkjet printing using inkjet printers. For example, the ink can be used in inkjet printing on substrates such as paper, plastic films, and metal films or sheets. The inkjet printing ink according to the present invention can form clear characters and photographic images on surfaces of the substrates.

The inkjet printing ink can not only form characters, photographs, etc., but also can be used in producing color filters for use in liquid crystal displays when the ink is printed on a transparent plastic substrate.

The inkjet technique is not particularly limited and a known technique such as a continuous jet technique (charge-control technique, spray technique, etc.) and on-demand technique (piezoelectric, thermal, electrostatic, etc.) can be applied.

The printed material formed by printing with an inkjet printing ink according to the present invention has high rubfastness and thus the printed images rarely undergo deteriorations caused by separation of the pigment or the like and have high color densities. Thus, for example, the ink can be used in various usages such as photographic printing by inkjet printing and printed materials obtained by high-speed inkjet printing.

EXAMPLES

The present invention will now be described in further detail using Examples and Comparative Examples.

Example 1

Into a container equipped with a thermometer, a nitrogen gas inlet tube, and a stirrer and purged with nitrogen, 64.2 parts by mass of methyl ethyl ketone was added and 18.4 parts by mass of 2,2-dimethylol propionic acid and 33.9 parts by mass of isophorone diisocyanate were mixed in the methyl ethyl ketone. The reaction was conducted for 4 hours at 80° C. After 4 hours, 38.2 parts by mass of methyl ethyl ketone was further fed, the resulting mixture was cooled to 60° C. or less, and 140.1 parts by mass of polyether polyol (polytetramethylene glycol "PTMG 2000" produced by Mitsubishi Chemical Corporation, number-average molecular weight: 1000) and 0.01 parts by mass of dibutyl tin dilaurate (DBTDL hereinafter) were further added to the mixture. The reaction was continued at 80° C.

After confirming that the weight-average molecular weight of the reaction product had reached a range of 20000 to 50000, 1.3 parts by mass of methanol was added to terminate the reaction. Then 41.6 parts by mass of methyl ethyl ketone was added to obtain an organic solvent solution of a urethane resin.

To the organic solvent solution of the urethane resin, 15.1 parts by mass of a 50% by mass aqueous potassium hydroxide solution was added to neutralize some or all of the carboxyl groups of the urethane resin. Then 848.5 parts by mass of water was added, followed by thorough stirring. As a result, a mixture (II'-1) containing a urethane resin, methyl ethyl ketone, and water, in which the urethane resin was dispersed or dissolved in the water, was obtained.

The mixture (II'-1) was aged for about 2 hours and 0.07 parts by mass of Surfynol 440 (ethylene oxide adduct of acetylene glycol produced by Air Products and Chemicals, Inc., nonvolatile content: 100% by mass) was added to the mixture (II'-1), followed by stirring for about 20 minutes to obtain a mixture (II-1). The mixture (II-1) was distilled under a vacuum condition of about 1 no 50 kPa.

After confirming that 144 parts by mass of methyl ethyl ketone contained in the mixture (II-1) had been removed, 0.03 parts by mass of Surfynol 440 (produced by Air Products and Chemicals, Inc.) was added under vacuum and vacuum distillation was continued. Then removal of 147 parts by mass of water in the mixture (II-1) was confirmed and the vacuum distillation was terminated.

Then water was added to adjust the nonvolatile content. As a result, 1000 parts by mass of a binder (III-1) for inkjet printing ink and having a nonvolatile content of 20% by mass was obtained.

Example 2

Into a container equipped with a thermometer, a nitrogen gas inlet tube, and a stirrer and purged with nitrogen, 63.9 parts by mass of methyl ethyl ketone was added and 18.2 parts by mass of 2,2-dimethylol propionic acid and 52.3 parts by mass of isophorone diisocyanate were mixed in the methyl ethyl ketone. The reaction was conducted for 4 hours at 80° C. After 4 hours, 39.1 parts by mass of methyl ethyl ketone was further fed, the resulting mixture was cooled to 60° C. or less, and 120.2 parts by mass of polyether polyol (polytetramethylene glycol "PTMG 2000" produced by Mitsubishi Chemical Corporation, number-average molecular weight: 1000) and 0.01 parts by mass of dibutyl tin dilaurate (DBTDL hereinafter) were further added to the mixture. The reaction was further carried out for 4 hours at 80° C. to obtain an organic solvent solution of a urethane resin.

The organic solvent solution of the urethane resin was added to an aqueous solution containing 15.0 parts by mass of a 50% by mass aqueous potassium hydroxide solution, 807.1 parts by mass of water, and 1.8 parts by mass of ethylene diamine under stirring. As a result, a mixture (II'-2) was obtained.

The mixture (II'-2) was aged for about 2 hours and 0.07 parts by mass of Surfynol 440 (produced by Air Products and Chemicals, Inc.) was added, followed by stirring for about 20 minutes to obtain a mixture (II-2). The mixture (II-2) was distilled under a vacuum condition of about 1 to 50 kPa.

After confirming that 103 parts by mass of methyl ethyl ketone contained in the mixture (II-2) had been removed, 0.03 parts by mass of Surfynol 440 (produced by Air Products and Chemicals, Inc.) was added under vacuum and vacuum distillation was continued. Then removal of 107 parts by mass of water in the mixture (II-2) was confirmed and the vacuum distillation was terminated.

Then water was added to adjust the nonvolatile content. As a result, 1000 parts by mass of a binder (III-2) for inkjet printing ink and having a nonvolatile content of 20% by mass was obtained.

Example 3

The mixture (II'-1) obtained in Example 1 was aged for about 2 hours and 0.07 parts by mass of Surfynol 440 (produced by Air Products and Chemicals, Inc.) was added to the mixture (II'-1), followed by stirring for about 20 minutes to obtain a mixture (II-3). The mixture (II-3) was distilled under a vacuum condition of about 1 to 50 kPa.

After confirming that 144 parts by mass of methyl ethyl ketone contained in the mixture (II-3) had been removed, 0.03 parts by mass of Surfynol 440 (produced by Air Products and Chemicals, Inc.) was added under vacuum and the vacuum distillation was continued.

Then removal of 90 parts by mass of water in the mixture (II-3) was confirmed and the vacuum distillation was terminated.

Then water was added to adjust the nonvolatile content. As a result, 1000 parts by mass of a binder (III-3) for inkjet printing ink and having a nonvolatile content of 20% by mass was obtained.

Example 4

The mixture (II'-1) obtained in Example 1 was aged for about 2 hours and 0.03 parts by mass of Surfynol 440 (produced by Air Products and Chemicals, Inc.) was added to the mixture (II'-1), followed by stirring for about 20 minutes to obtain a mixture (II-4). The mixture (II-4) was distilled under a vacuum condition of about 1 to 50 kPa.

After confirming that 144 parts by mass of methyl ethyl ketone contained in the mixture (II-4) had been removed, 0.07 parts by mass of Surfynol 440 (produced by Air Products and Chemicals, Inc.) was added under vacuum and the vacuum distillation was continued. Then removal of 147 parts by mass of water in the mixture (II-4) was confirmed and the vacuum distillation was terminated.

Then water was added to adjust the nonvolatile content. As a result, 1000 parts by mass of a binder (III-4) for inkjet printing ink and having a nonvolatile content of 20% by mass was obtained.

Example 5

The mixture (II'-1) obtained in Example 1 was aged for about 2 hours and 0.10 parts by mass of Surfynol 440 (produced by Air Products and Chemicals, Inc.) was added to the mixture (II'-1), followed by stirring for about 20 minutes to obtain a mixture (II-5). The mixture (II-5) was distilled under a vacuum condition of about 1 to 50 kPa.

After confirming that 144 parts by mass of methyl ethyl ketone contained in the mixture (II-5) had been removed and that 147 parts by mass of water contained in the mixture (II-5) had been removed, the vacuum distillation was terminated.

Then water was added to adjust the nonvolatile content. As a result, 1000 parts by mass of a binder (III-5) for inkjet printing ink and having a nonvolatile content of 20% by mass was obtained.

Example 6

Into a container equipped with a thermometer, a nitrogen gas inlet tube, and a stirrer and purged with nitrogen, 64.1 parts by mass of methyl ethyl ketone was added and 140.1 parts by mass of polyether polyol (polytetramethylene glycol "PTMG 2000" produced by Mitsubishi Chemical Corporation, number-average molecular weight: 1000), 33.9 parts by mass of isophorone diisocyanate, and 0.01 parts by mass of DBTDL were mixed in the methyl ethyl ketone. The reaction was conducted for 4 hours at 80° C. After 4 hours, 38.2 parts by mass of methyl ethyl ketone was further fed, the resulting mixture was cooled to 60° C. or less, and 18.4 parts by mass of 2,2-dimethylol propionic acid was added. The reaction was continued at 80° C.

After confirming that the weight-average molecular weight of the reaction product had reached a range of 20000 to 50000, 1.3 parts by mass of methanol was added to terminate the reaction.

Then 41.6 parts by mass of methyl ethyl ketone was added to obtain an organic solvent solution of a urethane resin.

To the organic solvent solution of the urethane resin, 15.1 parts by mass of a 50% by mass aqueous potassium hydroxide solution was added to neutralize some or all of the carboxyl groups of the urethane resin. Then 848.5 parts by mass of water was added, followed by thorough stirring. As a result, a mixture (II'-6) containing a urethane resin, methyl ethyl ketone, and water, in which the urethane resin was dispersed or dissolved in the water, was obtained.

The mixture (II'-6) was aged for about 2 hours and 0.07 parts by mass of Surfynol 440 (produced by Air Products and Chemicals, Inc.) was added to the mixture (II'-6), followed by stirring for about 20 minutes to obtain a mixture (II-6). The mixture (II-6) was distilled under a vacuum condition of about 1 to 50 kPa.

After confirming that 144 parts by mass of methyl ethyl ketone contained in the mixture (II-6) had been removed, 0.03 parts by mass of Surfynol 440 (produced by Air Products and Chemicals, Inc.) was added under vacuum and vacuum distillation was continued. Then removal of 147 parts by mass of water in the mixture (II-6) was confirmed and the vacuum distillation was terminated.

Then water was added to adjust the nonvolatile content. As a result, 1000 parts by mass of a binder (III-6) for inkjet printing ink, and having a nonvolatile content of 20% by mass was obtained.

Example 7

Into a container equipped with a thermometer, a nitrogen as inlet tube, and a stirrer and purged with nitrogen, 64.2 parts by mass of methyl ethyl ketone was added and 140.1 parts by mass of polyether polyol (polytetramethylene glycol "PTMG 2000" produced by Mitsubishi Chemical Corporation, number-average molecular weight: 1000), 18.4 parts by mass of 2,2-dimethylol propionic acid, 33.9 parts by mass of isophorone diisocyanate, and 0.01 parts by mass of dibutyl tin dilaurate (DBTDL hereinafter) were mixed in the methyl ethyl ketone. The reaction was conducted for 4 hours at 80° C. After 4 hours, 38.2 parts by mass of methyl ethyl ketone was further fed and the reaction was continued.

After confirming that the weight-average molecular weight of the reaction product had reached a range of 20000 to 50000, 1.3 parts by mass of methanol was added to terminate the reaction. Then 41.6 parts by mass of methyl ethyl ketone was added to obtain an organic solvent solution or a urethane resin.

To the organic solvent solution of the urethane resin, 15.1 carts by mass of a 50% by mass aqueous potassium hydroxide solution was added to neutralize some or all of the carboxyl groups of the urethane resin. Then 848.5 parts by mass of water was added, followed by thorough stirring. As a result, a mixture (II'-7) containing a urethane resin, methyl ethyl ketone, and water, in which the urethane resin was dispersed or dissolved in the water, was obtained.

The mixture (II'-7) was aged for about 2 hours and 0.07 parts by mass of Surfynol 440 (produced by Air Products and Chemicals, Inc.) was added to the mixture (II'-7), followed by stirring for about 20 minutes to obtain a mixture (II-7). The mixture (II-7) was distilled under a vacuum condition of about 1 to 50 kPa.

After confirming that 144 parts by mass of methyl ethyl ketone contained in the mixture (II-7) had been removed, 0.03 parts by mass of Surfynol 440 (produced by Air Products and Chemicals, Inc.) was added under vacuum and vacuum distillation was continued. Then removal of 147 parts by mass of water in the mixture (II-7) was confirmed and the vacuum distillation was terminated.

Then water was added to adjust the nonvolatile content. As a result, 1000 parts by mass of a binder (III-7) for inkjet printing ink and having a nonvolatile content of 20% by mass was obtained.

Comparative Example 1

The mixture (II'-1) obtained in Example 1 was aged for about 2 hours, followed, by stirring for about 20 minutes. The mixture (II'-1) was distilled under a vacuum condition of about 1 to 50 kPa.

After confirming that 144 parts by mass of methyl ethyl ketone contained in the mixture had been removed and that 147 parts by mass of water contained in the mixture (II'-1) had been removed, the vacuum distillation was terminated.

Then water was added to adjust the nonvolatile content. As a result, 1000 parts by mass of a binder (III'-1) for inkjet printing ink and having a nonvolatile content of 20% by mass was obtained.

Comparative Example 2

The mixture (II'-1) obtained in Example 1 was aged for about 2 hours and 0.07 parts by mass of NOPCO 8034L (silicone mineral oil-based defoaming agent produced by San Nopco Limited) was added to the mixture (II'-1), followed by stirring for about 20 minutes. As a result, a mixture (II'-8) was obtained. The mixture was distilled under a vacuum condition of about 1 to 50 kPa.

After confirming that 144 parts by mass of methyl ethyl ketone contained in the mixture (II'-8) had been removed, 0.03 parts by mass of NOPCO 8034L (silicone mineral oil-based defoaming agent produced by San Nopco Limited) was added under vacuum and the vacuum distillation was continued. Then removal of 147 parts by mass of water in the mixture (II'-8) was confirmed and the vacuum distillation was terminated.

Then water was added to adjust the nonvolatile content. As a result, 1000 parts by mass of a binder (III'-8) for inkjet printing ink and having a nonvolatile content of 20% by mass was obtained.

TABLE 1

| | Example 1 | Example 2 | Example 3 | Example 4 |
|---|---|---|---|---|
| Acetylene compound content in binder for inkjet printing inks | 0.1 | 0.1 | 0.1 | 0.1 |

TABLE 1-continued

| | Example 1 | Example 2 | Example 3 | Example 4 |
|---|---|---|---|---|
| [Acetylene compound/hydrophilic-group-containing urethane resin] (mass ratio) | 0.05 | 0.05 | 0.05 | 0.05 |
| Nonvolatile content of binder for inkjet printing ink (mass %) | 20 | 20 | 20 | 20 |
| Weight-average molecular weight of urethane resin | 34000 | 70000 | 40000 | 38000 |
| Amount of remaining organic solvent (ppm) | 100> | 100> | 1500 | 100> |
| Time taken for vacuum distillation (removal of solvent and water) | 4 | 4 | 4 | 8 |
| Evaluation of productivity | A | A | A | B |

TABLE 2

| | Example 5 | Example 6 | Example 7 | Comparative Example 1 | Comparative Example 2 |
|---|---|---|---|---|---|
| Acetylene compound content in binder for inkjet printing inks | 0.1 | 0.1 | 0.1 | 0 | 0 |
| [Acetylene compound/hydrophilic-group-containing urethane resin] (mass ratio) | 0.05 | 0.05 | 0.05 | 0 | 0 |
| Nonvolatile content of binder for inkjet printing ink (mass %) | 20 | 20 | 20 | 20 | 20 |
| Weight-average molecular weight of urethane resin | 37000 | 33000 | 30000 | 35000 | 35000 |
| Amount of remaining organic solvent (ppm) | 100> | 100> | 100> | 200 | 100> |
| Time taken for vacuum distillation (removal of solvent and water) | 6 | 4 | 4 | 15 | 4 |
| Evaluation of productivity | B | A | A | C | A |

[Method for Measuring Weight-Average Molecular Weight]

The weight-average molecular weight of the hydrophilic-group-containing urethane resin (A) was measured with a gel permeation chromatograph (GPC method). To be specific, a hinder for inkjet printing inks according to the present invention was applied to a glass plate with a 3 mil applicator and dried with a drier to form a coating film. The coating film was peeled from the glass plate and 0.4 g of the coating film was dissolved in 100 g of tetrahydrofuran to prepare a measurement sample.

A high-performance liquid chromatograph HLC-8220 produced by Tosoh Corporation was used as the measurement instrument. Columns TSK-GEL (HXL-H, G5000HXL, G4000HXL, G3000HXL, and G2000HXL) produced by Tosoh Corporation were used in combination as the columns.

Polystyrene standards produced by Showa. Denko K.K., and Tosoh Corporation were used as standard samples (molecular weights: 4430000, 4250000, 2880000, 2750000, 1850000, 860000, 450000, 411000, 355000, 190000, 160000, 96400, 50000, 37900, 19800, 19600, 5570, 4000, 2980, 2030, and 500) to obtain calibration curves.

Tetrahydrofuran was used as an eluent and a sample-dissolving liquid. The weight-average molecular weight was measured at a flow rate of 1 mL/min, a sample injection amount of 500 μL, and a sample concentration of 0.4% by using an RI detector.

[Method for Measuring Remaining Organic Solvent]

The amount of the solvent (methyl ethyl ketone) that may remain in the binder for inkjet printing inks obtained as described above was determined with a gas chromatograph ("GC-2014" produced by Shimadzu Corporation).

[Evaluation Standard for Productivity]

A: The remaining organic solvent content was less than 100 ppm and the vacuum distillation time was within 5 hours.

B: The remaining organic solvent content was less than 100 ppm or the vacuum distillation time was within 5 hours.

C: The remaining organic solvent content was 100 ppm or more and the vacuum distillation time exceeded 5 hours.

Preparation Example 1

Aqueous Dispersion of Quinacridone Pigment

Into a 50 L planetary mixer PLM-V-50V (produced by Inoue Manufacturing. Co., Ltd.), 1500 g of a vinyl polymer (styrene/acrylic acid/methacrylic acid=77/10/13 (mass ratio), weight-average molecular weight: 11000, acid value: 156 mgKOH/g), 4630 g of a quinacridone pigment (Cromophtal Jet Magenta DMQ produced by Ciba Specialty Chemicals), 380 g of phthalimidomethylated 3,10-dichloro-quinacridone (average number of phthalimidomethyl groups per molecule: 1.4), 2600 g of diethylene glycol, and 688 g of a 34% by mass aqueous potassium hydroxide solution were charged. The jacket was heated and kneading was conducted at a low speed (number of rotations: 21 rotations/min, number of revolutions: 14 revolutions/mm) until the content temperature reached 60° C. After the content temperature reached 60° C., the speed was changed to a high speed (number of rotations: 35 rotations/min, number of revolutions: 24 revolutions/min) and the kneading was continued for 4 hours.

To the kneaded material, a total of 8000 g of ion exchange water heated to 60° C. was added in 2 hours and a colored resin composition having a nonvolatile content of 37.9% by mass was obtained as a result.

To 12 kg of the colored resin composition obtained as above, 744 g of diethylene glycol and 7380 g of ion exchange water were gradually added while stirring with a disperser/stirrer. As a result, a precursor of an aqueous pigment dispersion (aqueous pigment dispersion before a dispersion treatment) was obtained.

Eighteen kilograms of the precursor of the aqueous pigment dispersion was treated in a bead mill (nanomill NM-G2L produced by Asada Iron Works Co., Ltd., zirconia beads, bead diameter: 0.3 mm, bead charge: 85%, cooling water temperature: 10° C., number of rotations: 2660 rotations per minute (disk peripheral speed: 12.5 m/sec), liquid feed: 200 g/10 sec). The liquid that had passed through the bead mill was centrifuged at 13000 G×10 minutes and filtered with a filter having an effective pore diameter of 0.5 μm. As a result, an aqueous pigment dispersion of a quinacridone pigment was obtained. The quinacridon pigment concentration in the aqueous pigment dispersion was 14.9% by mass.

[Preparation Example of Inkjet Printing Ink]

Inks (IV-1) to (IV-7), (IV'-1), and (IV'-8) for inkjet printing were each obtained by mixing one of the binders (III-1) to (III-7), (III'-1), and (III'-8) for inkjet printing ink obtained in Examples 1 to 7 and Comparative Examples 1 and 2, the quinacridone pigment obtained in Preparation Example 1, 2-pyrrolidinone, triethylene glycol monobutyl ether, glycerin, a surfactant (Surfynol 440 produced by Air Products and Chemicals, Inc.), and ion exchange water at a blend ratio described below so that the quinacridone pigment concentration was 4% by mass relative to the total amount of the inkjet printing ink and the hydrophilic-group-containing urethane resin (A) concentration was 1% by mass.

(Blend Ratio of Pigment Inkjet Printing Ink)

Water-based quinacridone pigment dispersion obtained in Preparation Example 1 (pigment concentration: 14.9% by mass): 26.8 g 2-Pyrrolidinone: 8.0 g
Triethylene glycol monobutyl ether: 8.0 g
Glycerin: 3.0 g
Surfactant (Surfynol 440 produced by Air Products and Chemicals, Inc.): 0.5 g
Ion exchange water: 48.7 g
Binder for inkjet printing inks obtained in Examples 1 to 7 and Comparative Examples 1 and 2: 5.0 g

[Evaluation of Blend Stability of Ink]

The blend stability of the ink was evaluated on the basis of the viscosity of the inkjet printing ink obtained as above and the particle diameter of dispersed particles in the ink.

[Method for Evaluating Blend Stability (I) on the Basis of Viscosity]

The initial viscosity of the inkjet printing ink obtained as above was measured with VISCOMETER TV-22 produced by Tokai Sangyo Co., Ltd. The ink was then sealed in a glass container such as a screw bottle and subjected to a heating test in a 70° C. thermostat for 6 weeks. The viscosity of the ink after the test was measured by the same method.

The change in viscosity of the ink before and after the heating test was calculated by Expression (I) below to conduct evaluation.

$$[(\text{Viscosity of ink after heating test})/(\text{viscosity of ink before heating test})] \times 100 \quad \text{(Expression I)}$$

[Evaluation Standard]
A: The rate of change in viscosity was less than 2%.
B: The rate of change in viscosity was 2% or more and less than 5%.
C: The rate of change in viscosity was 5% or more.

[Method for Evaluating Blend Stability (II) on the Basis of Particle Diameter]

The particle diameter of dispersed particles contained in the inkjet printing ink obtained as above was measured with Microtrac UPA EX150 produced by Nikkiso Co., Ltd. The ink, was then sealed in a glass container such as a screw bottle and subjected to a heating test in a 70° C. thermostat for 6 weeks. The particle diameter of the dispersed particles contained in the ink was measured before and after the test by the same method.

The change in particle diameter of the dispersed particles contained in the ink before and after the heating test was calculated by Expression (II) below to conduct evaluation.

$$[(\text{Diameter of dispersed particles in ink after heating test})/(\text{Diameter of dispersed particles in ink before heating test})] \times 100 \quad \text{(Expression II)}$$

[Evaluation Standard]
A: The rate of change in particle diameter was less than 3%.
B: The rate of change in particle diameter was 3% or more and less than 10%.
C: The rate of change in particle diameter was 10% or more.

[Evaluation of Ink Discharge Stability]

A diagnostic page was printed with Photosmart D5360 (produced by Hewlett-Packard) having a black ink cartridge filled with the inkjet printing ink described above and the conditions of the nozzles were checked. After continuously printing a 18 cm×25 cm solid image having a printing density set to 100% on 500 sheets, the diagnostic page was again printed to check the conditions of the nozzles. The change in the conditions of the nozzles before and after the continuous solid printing was evaluated as the ink discharge stability. The evaluation standard is as follows.

[Evaluation Standard]
AA: Conditions of the nozzles did not change and in appropriate discharge did not occur.
A: Although slight adhesion of the ink onto nozzles was observed, ink was discharged in inappropriate directions.
B: Ink discharge in inappropriate directions and/or ink discharge failure occurred after continuously printing the solid image on 500 sheets.
C: Ink discharge in inappropriate directions and/or ink discharge failure occurred during printing and continuous printing on 500 sheets could not be completed.

TABLE 3

|  | Example 1 | Examble 2 | Example 3 | Example 4 |
|---|---|---|---|---|
| Blend stability (I) | A | A | A | A |
| Blend stability (II) | A | A | A | A |
| Discharge stability | AA | A | AA | AA |

TABLE 4

|  | Example 5 | Example 6 | Example 7 | Comparative Example 1 | Comparative Example 2 |
|---|---|---|---|---|---|
| Blend stability (I) | A | A | A | B | A |
| Blend stability (II) | A | A | A | B | B |
| Discharge stability | AA | A | A | B | C |

The invention claimed is:

1. A method for producing a binder for inkjet printing inks, the binder containing a hydrophilic-group-containing urethane resin (A), an acetylene compound (B), and an aqueous medium (C), the acetylene compound (B) containing an alkylene oxide adduct of an acetylene glycol or an alkylene oxide adduct of an acetylene monoalcohol, the alkylene oxide containing ethylene oxide, the method comprising:
   step (1) of allowing a polyol (a1) containing a hydrophilic-group-containing polyol (a1-1) to react with a polyisocyanate (a2) in an organic solvent (D) or in the absence of a solvent, and feeding the organic solvent (D) in case the reaction is carried out in the absence of a solvent, to prepare an organic solvent (D) solution [I] of a hydrophilic-group-containing urethane resin (A);
   step (2) of mixing the organic solvent (D) solution [I] with the acetylene compound (B) and the aqueous medium (C) to prepare a mixture [II]; and
   step (3) of removing part of the aqueous medium (C) along with removing part or all of the organic solvent (D) contained in the mixture [II],
wherein the mass of the aqueous medium (C) to be removed is equal to 50% by mass to 300% by mass of the total mass of the organic solvent (D) contained in the mixture [II].

2. The method for producing a binder for inkjet printing inks according to claim 1, wherein the amount of the acetylene compound (B) used is 0.001 parts by mass to 0.5 parts by mass relative to 100 parts by mass of the hydrophilic-group-containing urethane resin (A).

3. The method for producing a binder for inkjet printing inks according to claim 2, wherein 60% by mass to 90% by mass of the acetylene compound (B) is used before the step (3), and 40% by mass to 10% by mass of the acetylene compound (B) is used in the step (3).

4. The method for producing a binder for inkjet printing inks according to claim 3, wherein 40% by mass to 10% by mass of the acetylene compound (B) used in the step (3) is fed to the mixture [II] after 80% by mass or more of the total amount of the organic solvent (D) contained in the mixture [II] has been removed from the mixture [II] and until the aqueous medium (C) having a mass equal to 10% by mass of the total amount of the organic solvent (D) contained in the mixture [II] is removed.

5. The method for producing a binder for inkjet printing inks according to claim 1, wherein the step (1) is a step of allowing the hydrophilic-group-containing polyol (a1-1) to react with the polyisocyanate (a2) in the organic solvent (D) to prepare an organic solvent (D) solution of a hydrophilic-group-containing urethane prepolymer (A-1) having a terminal isocyanate group, and
   then mixing the organic solvent (D) solution of the urethane prepolymer (A-1) with another polyol (a1-2) to induce a reaction so as to prepare an organic solvent (D) solution of the hydrophilic-group-containing urethane resin (A).

6. The method for producing a binder for inkjet printing inks according to claim 1, wherein the step (2) is a step of mixing the organic solvent (D) solution [I] of a hydrophilic-group-containing urethane resin (A) with the aqueous medium (C) to obtain a mixture [II'] containing the hydrophilic-group-containing urethane resin (A), the organic solvent (D), and the aqueous medium (C), the hydrophilic-group-containing urethane resin (A) being dispersed or dissolved in the aqueous medium (C), and then mixing the mixture [II'] with the acetylene compound (B) to prepare a mixture [II] thereof.

7. The method for producing a binder for inkjet printing inks according to claim 1, wherein a method for removing part of the organic solvent (D) and/or the aqueous medium (C) is a vacuum distillation method.

8. The method for producing a binder for inkjet printing inks according to claim 1, wherein the hydrophilic-group-containing urethane resin (A) has a cationic group or an anionic group as a hydrophilic group.

9. The method for producing a binder for inkjet printing inks according to claim 8, wherein the anionic group is at least one selected from the group consisting of a carboxyl group and a carboxylate group.

10. The method for producing a binder for inkjet printing inks according to claim 1, wherein the acetylene compound (B) is an alkylene oxide adduct of an acetylene glycol and the alkylene oxide contains ethylene oxide.

11. An inkjet printing ink comprising a binder obtained by the production method according to any one of claims 1 or 2-10, and a pigment or a dye.

12. The inkjet printing ink according to claim 11, wherein the hydrophilic-group-containing urethane resin (A) is contained in an amount of 0.1 to 10% by mass relative to the total amount of the inkjet printing ink and the aqueous medium (C) is contained in an amount of 0.1 to 50% by mass relative to the total amount of the inkjet printing ink.

13. A printed material formed by printing with the inkjet printing ink according to claim 11.

14. An inkjet printing ink for producing a color filter, comprising the binder for inkjet printing inks obtained by the production method according to any one of claims 1 or 2-10, and a pigment or a dye.

15. A color filter comprising a transparent plastic substrate on which the inkjet printing ink for producing a color filter according to claim 14 is printed.

* * * * *